(12) United States Patent
Sumita et al.

(10) Patent No.: US 11,476,491 B2
(45) Date of Patent: Oct. 18, 2022

(54) ELECTRODE PRESSURE-BONDING DEVICE

(71) Applicant: Murata Manufacturing Co., Ltd., Nagaokakyo (JP)

(72) Inventors: Masayuki Sumita, Nagaokakyo (JP); Hideyasu Kamigawa, Nagaokakyo (JP); Takeshi Yamamoto, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 260 days.

(21) Appl. No.: 16/743,179

(22) Filed: Jan. 15, 2020

(65) Prior Publication Data

US 2020/0153027 A1    May 14, 2020

Related U.S. Application Data

(63) Continuation of application No. PCT/JP2018/026740, filed on Jul. 17, 2018.

(30) Foreign Application Priority Data

Jul. 18, 2017    (JP) .............................. JP2017-139039

(51) Int. Cl.
  *H01M 4/04*    (2006.01)
  *H01M 10/0585*    (2010.01)
  *H01M 10/04*    (2006.01)

(52) U.S. Cl.
  CPC ....... *H01M 10/0404* (2013.01); *H01M 4/043* (2013.01); *H01M 10/0585* (2013.01)

(58) Field of Classification Search
  CPC ......... H01M 10/0404; H01M 10/0585; H01M 4/043
  See application file for complete search history.

(56) References Cited

U.S. PATENT DOCUMENTS

| 10,069,169 B2 | 9/2018 | Yang et al. |
| 2011/0123868 A1 | 5/2011 | Kawaoka et al. |
| 2015/0033547 A1 | 2/2015 | Yang et al. |

(Continued)

FOREIGN PATENT DOCUMENTS

| CN | 204019666 U | * 12/2014 |
| JP | 200242789 A | 2/2002 |
| JP | 2002367616 A | 12/2002 |

(Continued)

OTHER PUBLICATIONS

EPO machine generated English translation of JP 2004-281221-A (Year: 2004).*

(Continued)

*Primary Examiner* — Christopher P Domone
*Assistant Examiner* — Kimberly Wyluda
(74) *Attorney, Agent, or Firm* — ArentFox Schiff LLP

(57) ABSTRACT

An electrode pressure-bonding device that includes a feeding device that feeds a separator material in a strip shape in a feeding direction; a support stage under the separator material and configured to support an electrode on the separator material with the separator material interposed between the electrode and the support stage; and a pressure-bonding device that holds the separator material and the electrode together and pressure-bonds at least part of the separator material to the electrode.

16 Claims, 4 Drawing Sheets

(56) References Cited

U.S. PATENT DOCUMENTS

2018/0331388 A1    7/2018  Yang et al.
2019/0027462 A1 *  1/2019  Sugaya ............... H01L 21/2007

FOREIGN PATENT DOCUMENTS

| JP | 2004281221 A | 10/2004 | | |
|---|---|---|---|---|
| JP | 201432935 A | 2/2014 | | |
| JP | 2015528629 A | 9/2015 | | |
| WO | WO-2007122708 A1 * | 11/2007 | ............. | B29C 33/68 |
| WO | 2010064288 A1 | 6/2010 | | |
| WO | 2018127994 A1 | 7/2018 | | |

OTHER PUBLICATIONS

EPO machine generated English translation of CN-204019666-U (Year: 2014).*
English translation of JPWO-2007-122708-A1 obtained from Global Dossier (Year: 2007).*
International Search Report issued for PCT/JP2018/026740, dated Oct. 9, 2018.
Written Opinion of the International Searching Authority issued for PCT/JP2018/026740, dated Oct. 9, 2018.

* cited by examiner

ELECTRODE PRESSURE-BONDING DEVICE

CROSS REFERENCE TO RELATED APPLICATIONS

The present application is a continuation of International application No. PCT/JP2018/026740, filed Jul. 17, 2018, which claims priority to Japanese Patent Application No. 2017-139039, filed Jul. 18, 2017, the entire contents of each of which are incorporated herein by reference.

FIELD OF THE INVENTION

The present invention relates to an electrode pressure-bonding device for pressure-bonding a separator material in a strip shape and an electrode placed on the separator material.

BACKGROUND OF THE INVENTION

As electrode assemblies to configure a battery, electrode assemblies having a structure where positive electrodes and negative electrodes are alternatively laminated with a separator interposed therebetween have been known.

Patent Document 1 describes a manufacturing method for such an electrode assembly. According to the manufacturing method for an electrode assembly described in Patent Document 1, a first separator material in a strip shape and a second separator material in a strip shape, which are initially rolled up in a roll state, are respectively rolled out and laminated in such a way that the first separator material, a positive electrode, the second separator material, and a negative electrode are laminated in this order. Then, the laminate is cut into a predetermined shape, thereby preparing a unit structure. A plurality of the unit structures thus prepared is laminated to produce an electrode assembly.

Patent Document 1: Japanese Patent Application Laid-Open No. 2015-528629

SUMMARY OF THE INVENTION

Here, in preparing the unit structure, there is a possibility that positional misalignment may occur because the electrode (the positive electrode or the negative electrode) placed on the separator material would move together with the separator material due to the rolling-out of the separator material.

This invention is directed at solving the aforementioned problem, and an object of this invention is to provide an electrode pressure-bonding device capable of reducing the occurrence of such positional misalignment of the electrode placed on the separator material in a strip shape that would be caused in association with the movement of the separator material.

According to the present invention, there is provided an electrode pressure-bonding device that includes a feeding device that feeds a separator material in a strip shape in a feeding direction; a support stage under the separator material and configured to support an electrode placed on the separator material with the separator material interposed between the support stage and the electrode; and a pressure-bonding device that holds the separator material and the electrode together and pressure-bonds at least part of the separator material to the electrode.

The electrode pressure-bonding device may further include a moving device that moves the support stage and the pressure-bonding device.

The moving device may be configured to move the support stage from a first position to a third position while a feeding of the separator material is stopped from being fed in the feeding direction, the first position being a position where placing the electrode is placed on the separator material, and to move the pressure-bonding device from a second position to the first position, the second position being downstream of the first position in the feeding direction of the separator material, and the pressure-bonding device is configured to start the pressure-bonding of the separator material and the electrode at the first position.

The moving device may be configured to move the pressure-bonding device holding the separator material and the electrode together from the first position to the second position and move the support stage to the first position in conformity with a feeding speed of the separator material by the feeding device.

The support stage may include a suction mechanism for sucking up the electrode with the separator material interposed therebetween so as to assist in placing the electrode onto the separator material.

The support stage may include a gas blowing mechanism for blowing out a gas toward the separator material while the support stage is being moved from the first position to the third position.

The electrode pressure-bonding device may further include a clamp device between the support stage and the pressure-bonding device, and configured to clamp the separator material while the pressure-bonding device is being moved from the first position to the second position.

The support stage may include a heating mechanism that heats the separator material and the electrode.

The pressure-bonding device may have a portion that abuts with the separator material and the electrode, and the portion is made from a resin-based material.

The support stage may include a wrinkle reduction roller in contact with the separator material and that rotates while the support stage is being moved so as to reduce wrinkles from forming in the separator material.

The support stage and the pressure-bonding device may be integrated with each other, and the moving device may move the support stage and the pressure-bonding device integrally.

According to the electrode pressure-bonding device according to this invention, the pressure-bonding device is configured to pressure-bond at least part of the separator material and the electrode while the pressure-bonding device holds the separator material and the electrode together, thereby making it possible to reduce occurrence of the positional misalignment of the electrode on the separator material during feeding of the separator material in one direction.

DETAILED DESCRIPTION OF THE INVENTION

In the following, embodiments of this invention will be described to explain the characteristic features of this invention more concretely.

To begin with, a structure of the electrode assembly will be described briefly, and then a structure of an electrode pressure-bonding device and an electrode pressure-bonding method for use in preparing the electrode assembly will be described. The electrode assembly is applicable for use in batteries such as lithium ion batteries, for example.

Figure 1:
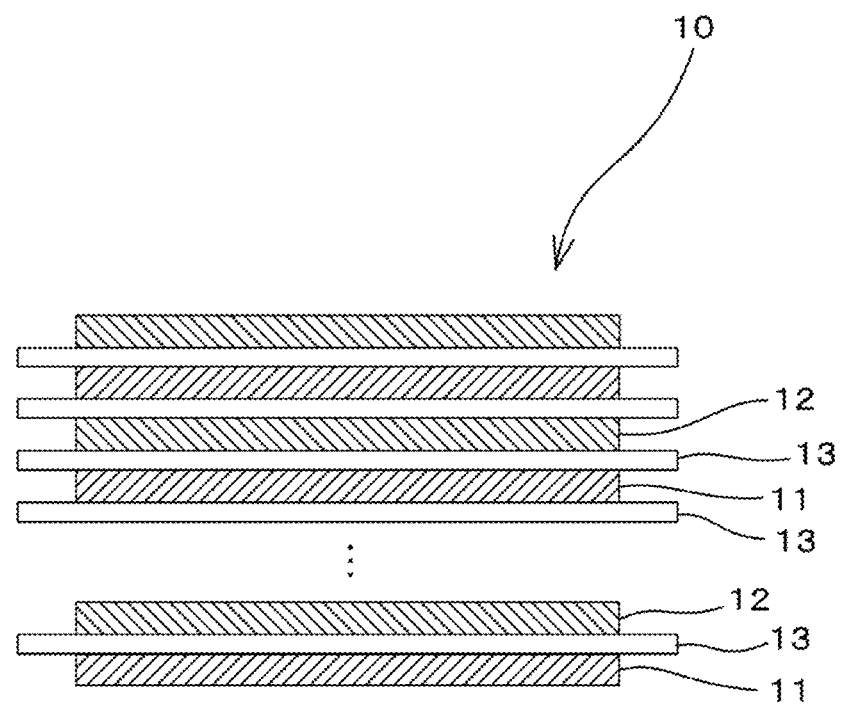
FIG. 1 is a cross-sectional view illustrating a structure of an electrode assembly.

FIG. 1 is a cross-sectional view illustrating a structure of an electrode assembly 10. The electrode assembly 10 has such a structure that a plurality of positive electrodes 11 and a plurality of negative electrodes 12 are laminated alternatively with a separator 13 interposed therebetween.

Each of the positive electrodes 11 includes a positive electrode current collector formed as a foil of a metal such as aluminum, and positive electrode active material layers respectively formed on both sides of the positive electrode current collector. The positive electrode active material layer may contain lithium cobaltate as a positive electrode active material, for example. If a positive electrode is located to be outermost of the electrode assembly 10 in a lamination direction, the electrode located to be outermost may be configured to include a positive electrode active material layer only on one side of the positive electrode current collector.

Each of the negative electrodes 12 includes a negative electrode current collector formed as a foil of a metal such as copper, and negative electrode active material layers respectively formed both sides of the negative electrode current collector. The negative electrode active material layer may contain black lead as a negative electrode active material, for example. If a negative electrode is located to be outermost of the electrode assembly 10 in the lamination direction, the negative electrode located to be outermost may be configured to include a negative electrode active material layer only on one side of the negative electrode current collector. The negative electrodes 12 may be identical with or different from the positive electrodes 11 in shape and size.

The separator 13 may be a microporous thin film made from polypropylene excellent in electrical insulation property, for example.

The electrode assembly 10 having a structure described above can be prepared, for example, by alternatively laminating a plurality of first unit electrode assemblies in each of which the positive electrode 11 is adhered to the separator 13, and a plurality of second unit electrode assemblies in each of which the negative electrode 12 is adhered to the separator 13. Unit electrode assemblies in each of which either the positive electrode 11 or the negative electrode 12 is adhered to the separator 13, like the first unit electrode assemblies and the second unit electrode assemblies can be prepared, by placing an electrode on a separator material in a strip shape, pressure-bonding the electrode to the separator, and cutting the separator material along periphery of the electrode into a predetermined shape.

In the following, an electrode pressure-bonding device for pressure-bonding a separator material in a strip shape, and an electrode placed on the separator material will be described.

First Embodiment

Figure 2:
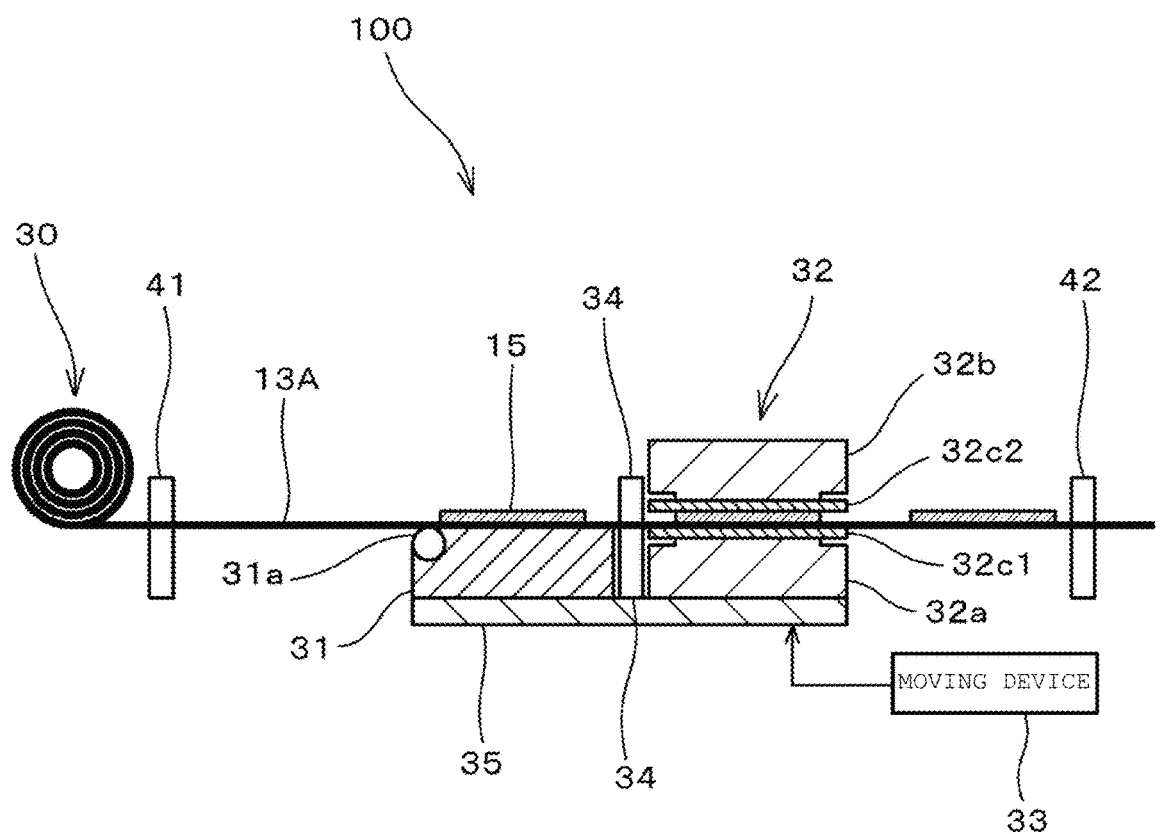
FIG. 2 is a side view illustrating a structure of an electrode pressure-bonding device according to a first embodiment.

FIG. 2 is a side view illustrating a structure of an electrode pressure-bonding device 100 according to a first embodiment. The electrode pressure-bonding device 100 according to the first embodiment includes a feeding device 30, a support stage 31, a pressure-bonding device 32, a moving device 33, and a clamp device 34.

The feeding device 30 is configured to roll out a separator material 13A in a strip shape from its rolled up configuration, and to feed the separator material 13A in one direction.

The support stage 31 is located below the separator material 13A, and configured to support the electrode 15 on the separator material 13A with the separator material 13A interposed between the support stage 31 and the electrode 15. The electrode 15 is a positive electrode 11 or a negative electrode 12.

The support stage 31 includes a suction mechanism for sucking up the electrode 15 on the separator material 13A with the separator material 13A interposed therebetween. By sucking up the electrode 15, it is possible to fix a position of the electrode 15 placed on the separator material 13A.

The pressure-bonding device 32 includes a thermal pressure-bonding stage 32a and a thermal pressure-bonding head 32b. Each of the thermal pressure-bonding stage 32a and the thermal pressure-bonding head 32b has a heater. Temperatures of the heater of the thermal pressure-bonding stage 32a and the heater of the thermal pressure-bonding head 32b can be set independently.

The pressure-bonding device 32 is configured to pressure-bond the separator material 13A and the electrode 15 together by holding the separator material 13A and the electrode 15 on the separator material 13A between the thermal pressure-bonding stage 32a and the thermal pressure-bonding head 32b. Details of a method for pressure-bonding the separator material 13A and the electrode 15 will be described later.

The thermal pressure-bonding stage 32a and the thermal pressure-bonding head 32b are made from a metal material (s), for example, but the thermal pressure-bonding stage 32a and the thermal pressure-bonding head 32b are provided with a portion 32c1 and a portion 32c2, respectively, which are made from a resin-based material(s), the portion 32c1 being a portion where the thermal pressure-bonding stage 32a abuts with the separator material 13A, and the portion 32c2 being a portion where the thermal pressure-bonding head 32b abuts with the electrode 15. That is, the thermal pressure-bonding stage 32a is provided with a first resin portion 32c1 where it abuts with the separator material 13A. Furthermore, the thermal pressure-bonding head 32b is provided with a second resin portion 32c2 where it abuts with the electrode 15. With this configuration, in performing the pressure-bonding, unevenness in thickness of the electrode 15 (that is, minute concavities and convexities) can be absorbed with the first resin portion 32c1 and the second resin portion 32c2, thereby making it possible to perform uniform pressure-bonding.

Note that, the resin-based material(s) may be a fluorine resin(s), for example.

Furthermore, it is preferable that the portion 32c1 where the thermal pressure-bonding stage 32a abuts with the separator material 13A be made from a material having a good releasability or be coated to improve releasability.

Here, the portion 32c1 where the thermal pressure-bonding stage 32a abuts with the separator material 13A, and the portion 32c2 where the thermal pressure-bonding head 32b abuts with the separator material 13A may be, for example, a resin plate made from a resin-based material. For example, the resin plates may be adhered to the thermal pressure-bonding stage 32a and the thermal pressure-bonding head 32b with an adhesive, or may be fixedly attached to the thermal pressure-bonding stage 32a and the thermal pressure-bonding head 32b by being held together by a holding member. By having the resin plate fixed on a surface of the thermal pressure-bonding stage 32a and the thermal pressure-bonding head 32b via adhesion or holding, it is possible to reduce thermal deformation of the resin plate due to difference in thermal expansion coefficient.

Of these resin plates, the resin plate to abut with the electrode 15 may have a shape substantially identical with a shape of the electrode 15, for example.

The moving device 33 is configured to move the support stage 31 and the pressure-bonding device 32 in a direction in which the separator material 13A in the strip shape extends. In this embodiment, the support stage 31, the thermal pressure-bonding stage 32a, and the clamp device 34 are fixed on a base plate 35, thereby being integrated with each other. Therefore, the moving device 33 moves the support stage 31, the thermal pressure-bonding stage 32a, and the clamp device 34 integrally. With this configuration in which the moving device 33 moves the support stage 31, the thermal pressure-bonding stage 32a, and the clamp device 34 integrally, the moving can be realized with a simpler configuration than a configuration for moving the support stage 31, the thermal pressure-bonding stage 32a, and the clamp device 34, separately.

For example, the configuration may include shafts movable on a bottom surface of the base plate 35 in the direction in which the separator material 13A in the strip shape extends, thereby being configured such that the moving device 33 causes the shafts to move thereby to move the base plate 35.

It should be noted that the moving the base plate 35 is not limited to these configurations.

Furthermore, the moving device 33 may be configured to move the support stage 31 and the pressure-bonding device 32, separately.

The clamp device 34 is provided between the support stage 31 and the pressure-bonding device 32, and is configured to clamp the separator material 13A while the pressure-bonding device 32 in holding the separator material 13A and the electrode 15 together for pressure-bonding is being moved, as described below. This makes it possible to reduce application of excess tension on the separator material 13A at periphery of the electrode 15 when the separator material 13A and the electrode 15 held together for pressure-bonding are being moved. Note that another clamp device for moving in pair with the clamp device 34 is also preferably provided and not illustrated in FIG. 2 (on the feeding direction side).

The support stage 31 described above includes a heating mechanism for heating the separator material 13A and the electrode 15. With this configuration, it is possible to pre-heat the separator material 13A and the electrode 15 before the pressure-bonding performed by the pressure-bonding device 32, thereby making it possible to shorten a time required to complete the pressure-bonding of the separator material 13A and the electrode 15.

The support stage 31 further includes a gas blowing mechanism for blowing out a gas toward the separator material 13A. The gas to be blown out is air, for example. Timing for blowing out the gas by the gas blowing mechanism will be described later.

The support stage 31 further includes a wrinkle reduction roller 31a for reducing wrinkles of the separator material 13A by rotating in touch with the separator material 13A while the support stage 31 is being moved.

Furthermore, this embodiment is provided with a first fixed-position clamp device 41 and a second fixed-position clamp device 42 for clamping the separator material 13A, in addition to the clamp device 34. The clamp device 34 is movable in the direction in which the separator material 13A extends, but the first fixed-position clamp device 41 and the second fixed-position clamp device 42 are not movable in the direction in which the separator material 13A extends.

Figure 3:
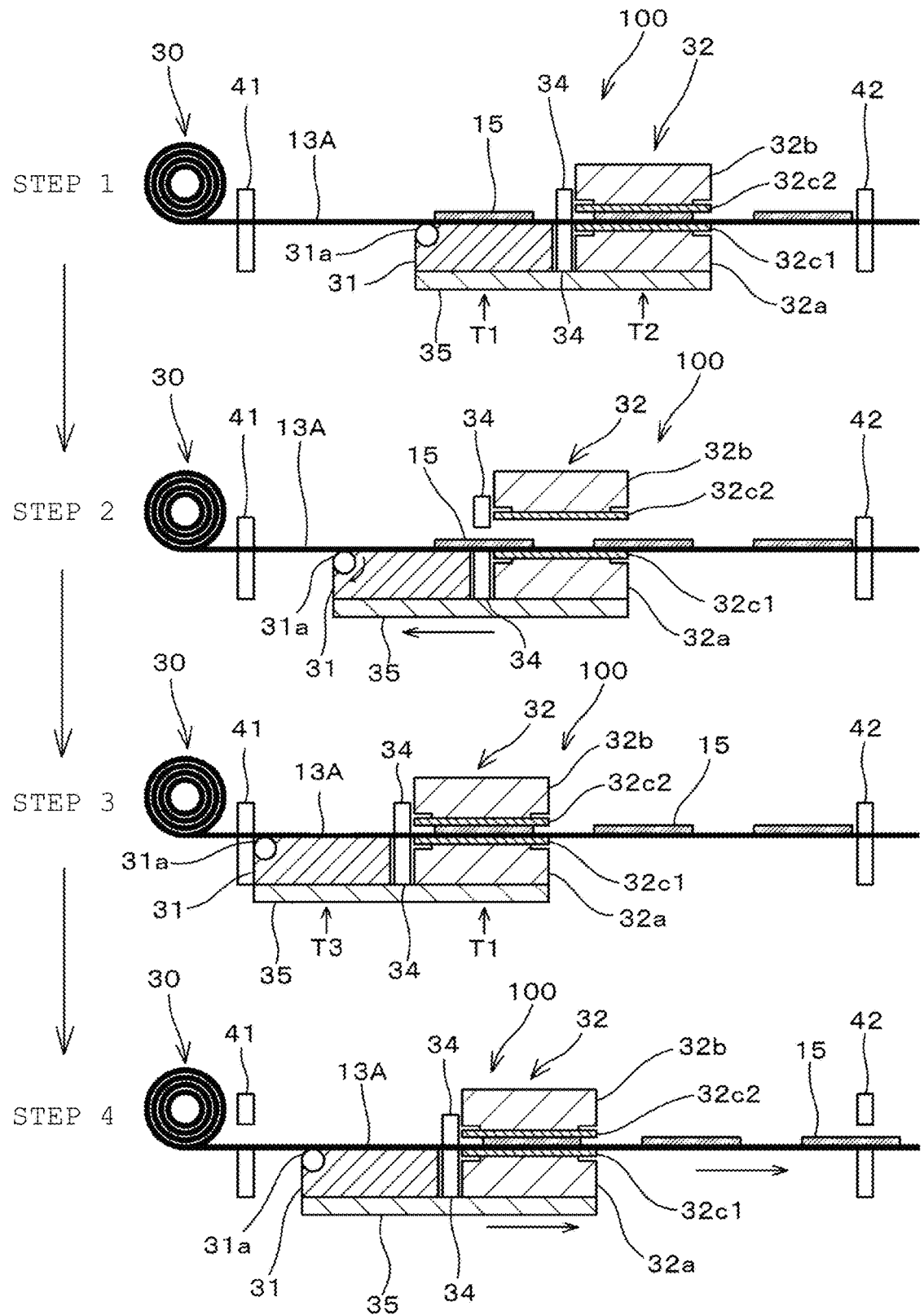
FIG. 3 is a view for explaining a method for pressure-bonding a separator material and an electrode by the electrode pressure-bonding device according to the first embodiment.

FIG. 3 is a view for explaining a pressure-bonding method for pressure-bonding the separator material 13A and the electrode 15 by the electrode pressure-bonding device 100 in the first embodiment. In the following, Step 1 to Step 4 illustrated in FIG. 3 will be explained in order. Note that the moving device 33 is omitted from the illustration in FIG. 3.

At Step 1, the support stage 31 is positioned at a first position T1, and the pressure-bonding device 32 is positioned at a second position T2. The first position T1 is a position where placing the electrode 15 on the separator material 13A is carried out. Furthermore, the second position T2 is a position located in downstream of the first position T1 in a feeding direction of the separator material 13A, and a position where the pressure-bonding device 32 is positioned when the support stage 31 is positioned at the first position T1. The second position T2 is also a position where the pressure-bonding of the separator material 13A and the electrode 15 is completed.

At Step 1, an electrode mounting device (not illustrated) mounts the electrode 15 on the separator material 13A at the first position T1. In doing this, the suction mechanism of the support stage 31 sucks up the electrode 15 with the separator material 13A interposed therebetween.

After the electrode 15 is placed on the separator material 13A, the heating mechanism of the support stage 31 heats up the separator material 13A and the electrode 15. This makes it possible to shorten the time necessary for pressure-bonding the separator material 13A and the electrode 15 by the pressure-bonding device 32, which is performed after this heating.

The electrode 15 positioned at the second position T2 is an electrode for which the pressure-bonding by the pressure-bonding device 32 has been completed. In response to the completion of the pressure-bonding, the thermal pressure-bonding head 32b moves upward at the second position T2. Furthermore, the clamp device 34 releases the clamping of the separator material 13A.

At Step 1 and at later-described Step 2 and Step 3, feeding of the separator material 13A is not carried out. That is, the separator material 13A is clamped by the first fixed-position clamp device 41 and the second fixed-position clamp device 42, and the position of each electrode 15 on the separator material 13A is not changed during Step 1 to Step 3.

At Step 2 subsequent to Step 1, the moving device 33 moves the support stage 31, the pressure-bonding device 32, and the clamp device 34. More specifically, the moving device 33 moves the support stage 31, the pressure-bonding device 32, and the clamp device 34 in order to position the support stage 31 at a third position T3 and position the pressure-bonding device 32 at the first position T1. When moving the support stage 31, the sucking of the electrode 15 by the suction mechanism is released.

In being moved from the first position T1 to the third position T3, the support stage 31 blows out the gas toward the separator material 13A by the gas blowing mechanism. This makes it possible to reduce occurrence of friction between the separator material 13A and the support stage 31 when the support stage 31 moves under the separator material 13A in the strip shape.

Furthermore, the wrinkles of the separator material 13A are reduced by the wrinkle reduction roller 31a rotating in touch with the separator material 13A while the support stage 31 is being moved.

After the pressure-bonding device 32 is moved to the first position T1, a process of Step 3 starts. At Step 3, the clamp device 34 clamps the separator material 13A.

Furthermore, at the first position T1, the thermal pressure-bonding head 32b of the pressure-bonding device 32 moves down to hold the separator material 13A and the electrode 15 together between the thermal pressure-bonding head 32b and the thermal pressure-bonding stage 32a, thereby starting the pressure-bonding of the separator material 13A and the electrode 15.

At Step 4 subsequent to Step 3, the first fixed-position clamp device 41 and the second fixed-position clamp device 42 release the clamping of the separator material 13A. After that, while the feeding device 30 is rolling out the separator material 13A, the moving device 33 moves the pressure-bonding device 32 holding the separator material 13A and the electrode 15 together for pressure-bonding from the first position T1 to the second position T2, and moves the support stage 31 from the third position T3 to the first position T1.

That is, the moving device 33 moves, from the first position T1 to the second position T2, the pressure-bonding device 32, which is performing the pressure-bonding of the separator material 13A and the electrode 15 being held together between the thermal pressure-bonding head 32b and the thermal pressure-bonding stage 32a. The moving of the pressure-bonding device 32 is carried out at a speed adjusted to be identical with a speed of the feeding of the separator material 13A. This makes it possible to move the support stage 31, the pressure-bonding device 32, and the clamp device 34 in conformity with the speed at which the separator material 13A is moved.

While the pressure-bonding device 32 holding the separator material 13A and the electrode 15 together for the pressure-bonding is being moved from the first position T1 to the second position T2, the clamp device 34 keeps the clamping of the separator material 13A. This makes it possible to reduce application of unnecessary tension onto the separator material 13A along the periphery of the electrode 15.

After the pressure-bonding device 32 moves to the second position T2, the pressure-bonding of the separator material 13A and the electrode 15 is completed, and the process of Step 1 is started again.

As described above, the electrode pressure-bonding device 100 according to this embodiment is so configured that, for performing the pressure-bonding of the separator material 13A and the electrode 15, the moving device 33 moves the support stage 31 from the first position T1 to the third position T3, and the pressure-bonding device 32 from the second position T2 to the first position T1. The pressure-bonding device 32 starts the pressure-bonding of the separator material 13A and the electrode 15 at the first position T1 where the electrode 15 is placed on the separator material 13A. This makes it possible to prevent the problem associated with the conventional method, that is, the occurrence of positional misalignment between the separator material 13A and the electrode 15, which would occur while the electrode 15 placed at the first position T1 is being moved from the first position T1 to the second position T2 where the pressure-bonding device 32 is positioned.

Especially, the electrode pressure-bonding device 100 according to this embodiment is so configured that the moving device 33 moves the pressure-bonding device 32 holding the separator material 13A and the electrode 15 together for pressure-bonding from the first position T1 to the second position T2 and the support stage 31 to the first position T1 in conformity with the feeding speed of the separator material 13A. This makes it possible to surely prevent the positional misalignment between the separator material 13A and the electrode 15 in transferring the electrode 15 on the separator material 13A from the first position T1 to the second position T2.

Here, in case where the electrode 15 is transferred from the first position T1 to the second position T2 within a predetermined time period, it is necessary to move the separator material 13A at a fast moving speed in case of a method in which the electrode 15 is transferred to the second position T2 after the pressure-bonding of the separator material 13A and the electrode 15 is completed at the first position T1. In this case, it is necessary to move the separator material 13A under a great tension. This results in a great shrinkage of the separator material 13A in the later steps, thereby making it impossible to cut the separator material 13A into a predetermined shape with a great accuracy.

However, the electrode pressure-bonding device 100 according to this embodiment is so configured that the transferring of the electrode 15 from the first position T1 to the second position T2 is carried out while the pressure-bonding is being carried out with the separator material 13A and the electrode 15 held together for pressure-bonding. This configuration makes it possible to allow a slow moving speed of the separator material 13A in transferring the electrode 15 from the first position T1 to the second position T2 within a predetermined time period. This allows to move the separator material 13A under a weak tension, which results in a smaller shrinkage of the separator material 13a in the later steps, and consequently makes it possible to cut the separator material 13A with a great accuracy.

Second Embodiment

The electrode pressure-bonding device 100 according to the first embodiment described above is so configured that the pressure-bonding is carried out in such a way that the separator material 13A and the electrode 15 are pressure-bonded to each other over an entire area where the separator material 13A and the electrode 15 are in touch with each other.

On the other hand, an electrode pressure-bonding device according to a second embodiment is so configured that pressure-bonding is locally carried out for part of the portion where the separator material 13A and the electrode 15 are in touch with each other. That is, a pressure-bonding device 32 for pressure-bonding the separator material 13A and the electrode 15 is configured to hold the separator material and the electrode together in such a way that both of the separator material 13A and the electrode 15 will be locally pressure-bonded.

In order to locally pressure-bond part of the portion where the separator material 13A and the electrode 15 are in touch with each other, the pressure-bonding device 32 has such a pressure-bonding surface, that is, a pressure-bonding surface of a thermal pressure-bonding stage 32a or a pressure-bonding surface of a thermal pressure-bonding head 32b, that has a recess portion. In this embodiment, the pressure-bonding surface of the thermal pressure-bonding stage 32a is provided with a first resin portion 32c1 and the pressure-bonding surface of the thermal pressure-bonding head 32b is provided with a second resin portion 32c2. Therefore, the first resin portion 32c1 of the thermal pressure-bonding stage 32a or the second resin portion 32c2 of the thermal pressure-bonding head 32b has the recess portion. Note that both of the first resin portion 32c1 of the thermal pressure-bonding stage 32a and the second resin portion 32c2 of the thermal pressure-bonding head 32b may have such a recess portion.

With this configuration, the pressure-bonding device 32 performs the pressure-bonding of the separator material 13A and the electrode 15 in such a way that the pressure-bonding of the separator material 13A and the electrode 15 is not carried out where the recess portion is present, while the pressure-bonding is carried out where the recess portion is absent. As a result of this, the pressure-bonding locally pressure-bonds part of the portion where the separator material 13A and the electrode 15 are in touch with each other.

Figure 4:
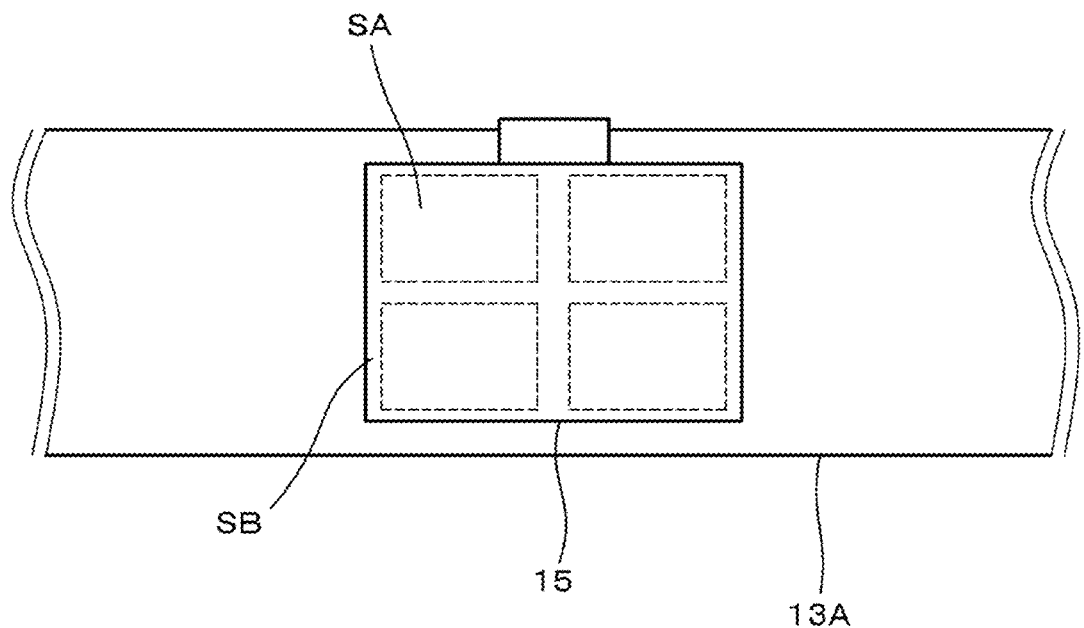
FIG. 4 is a view for explaining a pressure-bonding state of the separator material and the electrode pressure-bonded by a pressure-bonding device having quadrangular recess portions.

FIG. 4 is a view for explaining a pressure-bonding state of the separator material 13A and the electrode 15 pressure-bonded by the pressure-bonding device according to this embodiment. FIG. 4 illustrates a state of such pressure-bonding performed by using a pressure-bonding device having four recess portions, which are quadrangular in shape in a planar view. As illustrated in FIG. 4, in the area where the separator material 13A and the electrode 15 are in touch with each other, areas SA corresponding to the recess portions of the pressure-bonding device are non-pressure-bonding areas, while the other area SB is a pressure-bonding area.

Figure 5:
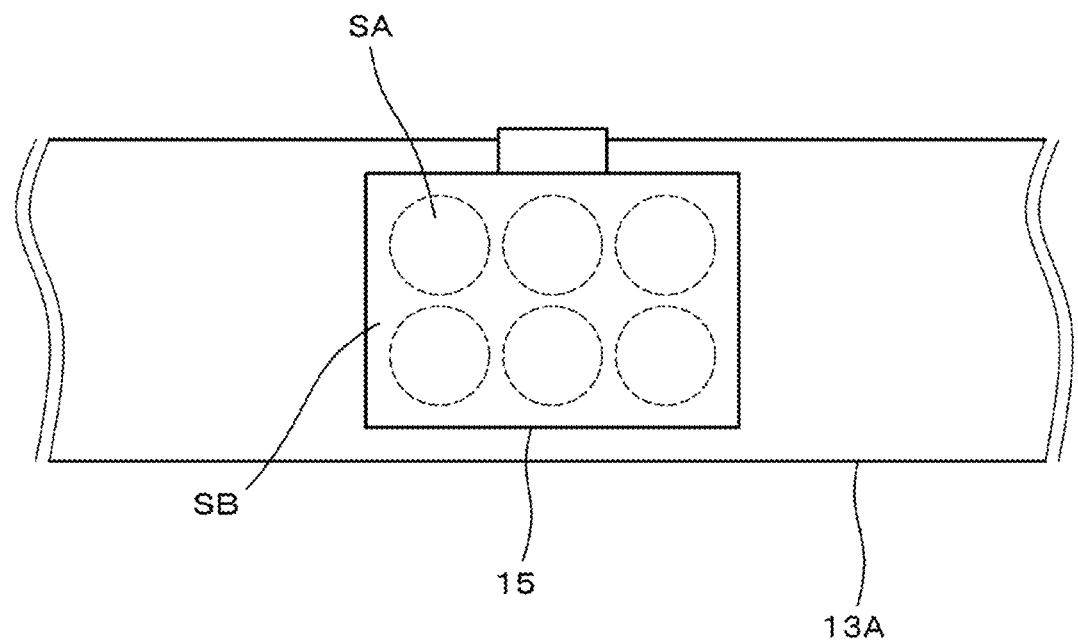
FIG. 5 is a view for explaining a pressure-bonding state of the separator material and the electrode pressure-bonded by a pressure-bonding device having circular recess portions.

Note that the shape of recess portions of the pressure-bonding device in the planar view is not limited to the quadrangle, and may be circular. FIG. 5 illustrates a state of the separator material 13A and the electrode 15 pressure-bonded by using a pressure-bonding device having four recess portions, which are circular in shape in a planar view.

The operation after the start of the pressure-bonding of the separator material 13A and the electrode 15 is similar to that in the first embodiment. That is, at Step 4 of FIG. 3, the pressure-bonding device 32 holding the separator material 13A and the electrode 15 together for pressure-bonding is moved from the first position T1 to the second position T2.

The electrode pressure-bonding device according to the second embodiment also makes it possible to prevent the occurrence of the positional misalignment between the separator material 13A and the electrode 15 in moving the electrode 15 placed on the separator material 13A in one direction.

Here, there is a possibility that an availability of an adhesive material of the separator material 13A would have been reduced in a pressure-bonding area on that one of both sides of the separator material 13A which faces a pressure-bonding surface of the electrode 15. Because of this, in later steps, there would be a possibility that pressure-bonding defects would occur between unit electrode assemblies in laminating and pressure-bonding a plurality of unit electrode assemblies each of which an electrode is pressure-bonded to a separator.

However, according to the electrode pressure-bonding device according to the second embodiment, only part of the portion where a separator and an electrode are in touch with each other is locally pressure-bonded, thereby leaving the adhesive material still available on a reverse side of the non-pressure-bonding area (the non-pressure-bonding areas SA in FIGS. 4 and 5). Therefore, in later steps, the pressure-bonding of the unit electrode assemblies can surely pressure-bond them by reducing the occurrence of the pressure-bonding defects.

Furthermore, according to the electrode pressure-bonding device according to the second embodiment, the separator material 13A and the electrode 15 are locally pressure-bonded, thereby resulting in a smaller pressure-bonding area. Therefore, for applying the same pressure-bonding pressure per area, overall pressure-bonding pressure required could be smaller for the electrode pressure-bonding device according to the second embodiment. Thus, compared with the electrode pressure-bonding device according to the first embodiment, the electrode pressure-bonding device according to the second embodiment can be downsized.

The present invention is not limited to the aforementioned embodiment, and may be modified or changed in various ways within the scope of the present invention.

The support stage 31, which has been described as including the suction mechanism for sucking up the electrode 15 with the separator material 13A interposed therebetween, may be configured without such a suction mechanism.

Moreover, the support stage 31 has been described as including the gas blowing mechanism for blowing out the gas toward the separator material 13A while being moving from the first position T1 to the third position T3, but may be configured without such a gas blowing mechanism.

Furthermore, the support stage 31, which has been described as including the heating mechanism for heating the separator material 13A and the electrode 15, may be configured without such a heating mechanism, if the separator material 13A is pressure-bondable even with a temperature of about 20 to 30° C. as long as a high pressure is applied thereon.

Furthermore, the support stage 31, which has been described as including the wrinkle reduction roller 31a for reducing wrinkles of the separator material 13A by rotating in touch with the separator material 13A, while the support stage 31 is being moved, may be configured without such a wrinkle reduction roller 31a.

The clamp device 34 provided between the support stage 31 and the pressure-bonding device 32 may be omitted.

The pressure-bonding device 32 has been described as having such a portion made from a resin-based material where to abut with the separator material 13A and the electrode 15, but the portion may be made from a material other than such a resin-based material.

The electrode pressure-bonding devices according to the first and second embodiments have been described as being configured to move the pressure-bonding device 32 holding the separator material 13A and the electrode 15 together for pressure-bonding from the first position T1 to the second position T2. However, the pressure-bonding device 32 may be moved without holding them together to pressure-bond by the pressure-bonding device 32 after at least part of the separator material 13A and the electrode 15 has been pressured bonded.

DESCRIPTION OF REFERENCE SYMBOLS

10: Electrode assembly
11: Positive electrode

12: Negative electrode
13: Separator
13A: Separator material
15: Electrode
30: Feeding device
31: Support stage
32: Pressure-bonding device
32a: Thermal pressure-bonding stage
32b: Thermal pressure-bonding head
32c1: First resin portion
32c2: Second resin portion
33: Moving device
34: Clamp device
35: Base plate
41: First fixed-position clamp device
42: Second fixed-position clamp device
100: Electrode pressure-bonding device
T1: Position where placing the electrode is carried out
T2: Position where the pressure-bonding device is positioned when the support stage is positioned at the first position
T3: Position where the support stage is positioned when the pressure-bonding device is positioned at the first position

The invention claimed is:

1. An electrode pressure-bonding device, comprising:
a feeding device that feeds a separator material in a strip shape in a feeding direction;
a support stage under the separator material and configured to support an electrode placed on the separator material with the separator material interposed between the support stage and the electrode;
a pressure-bonding device that holds the separator material and the electrode together and pressure-bonds at least a part of the separator material to the electrode; and
a moving device that moves the support stage and the pressure-bonding device, wherein
the moving device is configured to move the support stage from a first position to a third position while the separator material is stopped from being fed in the feeding direction, the first position being a position where the electrode is placed on the separator material, and to move the pressure-bonding device from a second position to the first position, the second position being downstream of the first position in the feeding direction of the separator material, and
the pressure-bonding device is configured to start the pressure-bonding of the separator material and the electrode at the first position.

2. The electrode pressure-bonding device according to claim 1, wherein the moving device is configured to move the pressure-bonding device holding the separator material and the electrode together from the first position to the second position and move the support stage to the first position in conformity with a feeding speed at which the separator material is fed in the feeding direction.

3. The electrode pressure-bonding device according to claim 2, wherein the support stage includes a suction mechanism for sucking up the electrode with the separator material interposed therebetween so as to assist in placing the electrode onto the separator material.

4. The electrode pressure-bonding device according to claim 1, wherein the support stage includes a suction mechanism for sucking up the electrode with the separator material interposed therebetween so as to assist in placing the electrode onto the separator material.

5. The electrode pressure-bonding device according to claim 1, wherein, the support stage includes a gas blowing mechanism for blowing out a gas toward the separator material while the support stage is being moved from the first position to the third position.

6. The electrode pressure-bonding device according to claim 4, wherein, the support stage includes a gas blowing mechanism for blowing out a gas toward the separator material while the support stage is being moved from the first position to the third position.

7. The electrode pressure-bonding device according to claim 1, further comprising a clamp device between the support stage and the pressure-bonding device, and configured to clamp the separator material while the pressure-bonding device is being moved from the first position to the second position.

8. The electrode pressure-bonding device according to claim 1, wherein the support stage includes a heating mechanism that heats the separator material and the electrode.

9. The electrode pressure-bonding device according to claim 1, wherein a portion of the pressure-bonding device that abuts with the separator material and the electrode includes a resin-based material.

10. An electrode pressure-bonding device, comprising:
a feeding device that feeds a separator material in a strip shape in a feeding direction;
a support stage under the separator material and configured to support an electrode placed on the separator material with the separator material interposed between the support stage and the electrode; and
a pressure-bonding device that holds the separator material and the electrode together and pressure-bonds at least a part of the separator material to the electrode,
wherein the support stage includes a wrinkle reduction roller in contact with the separator material and that rotates while the support stage is being moved so as to reduce wrinkles from forming in the separator material.

11. The electrode pressure-bonding device according to claim 1, wherein
the support stage and the pressure-bonding device are integrated with each other, and
the moving device moves the support stage and the pressure-bonding device integrally.

12. The electrode pressure-bonding device according to claim 1, wherein the pressure-bonding device is configured so as to pressure-bond the separator material and the electrode to each other over an entire area where the separator material and the electrode are in touch with each other.

13. The electrode pressure-bonding device according to claim 1, wherein the pressure-bonding device is configured so as to pressure-bond the separator material and the electrode to each other over only a part of an area where the separator material and the electrode are in touch with each other.

14. The electrode pressure-bonding device according to claim 1, wherein a portion of the pressure-bonding device that abuts with the separator material includes a resin-based material.

15. The electrode pressure-bonding device according to claim 1, wherein a portion of the pressure-bonding device that abuts with the electrode includes a resin-based material.

16. The electrode pressure-bonding device according to claim 1, wherein a first portion of the pressure-bonding device that abuts with the separator material includes a first resin-based material, and a second portion of the pressure-bonding device that abuts with the electrode includes a second resin-based material.

\* \* \* \* \*